J. BOWEN.
MILLING MACHINE.
APPLICATION FILED DEC. 27, 1912.
1,177,376.
Patented Mar. 28, 1916.
3 SHEETS—SHEET 1.
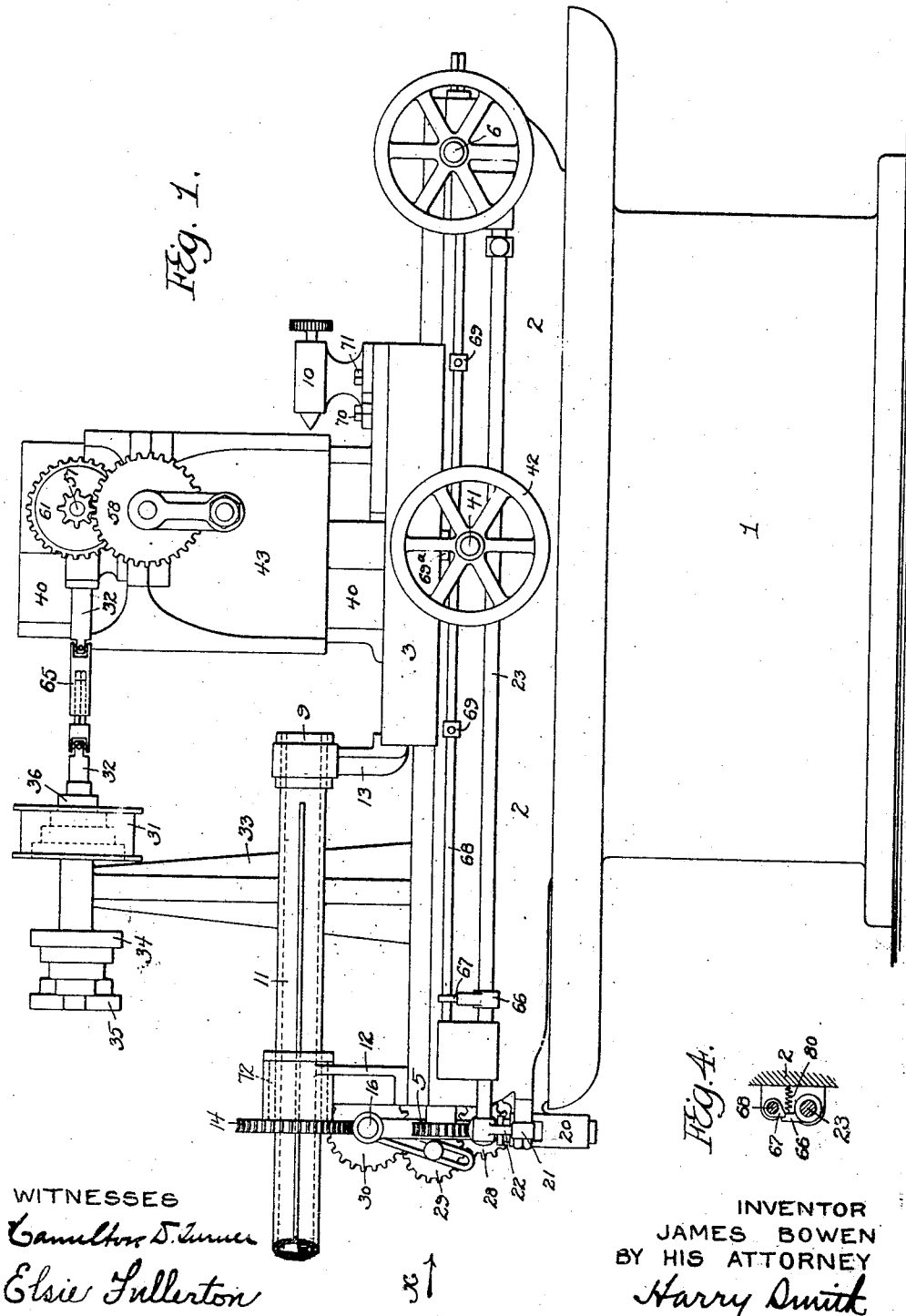
WITNESSES
Camulton T. Turner
Elsie Fullerton
INVENTOR
JAMES BOWEN
BY HIS ATTORNEY
Harry Smith J. BOWEN.
MILLING MACHINE.
APPLICATION FILED DEC. 27, 1912.
1,177,376.
Patented Mar. 28, 1916.
3 SHEETS—SHEET 2.
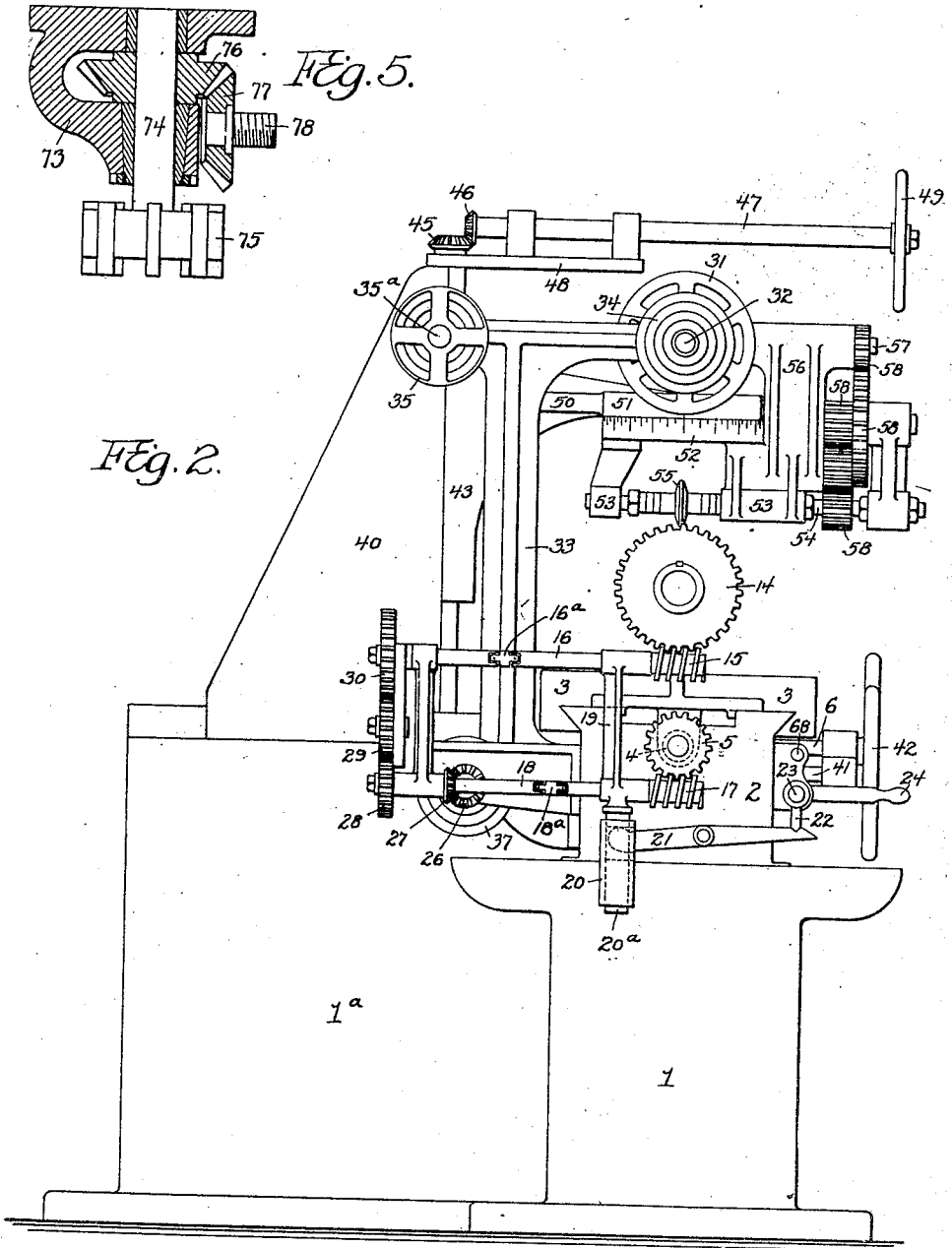
WITNESSES
INVENTOR
JAMES BOWEN
BY HIS ATTORNEY
Harry Smith

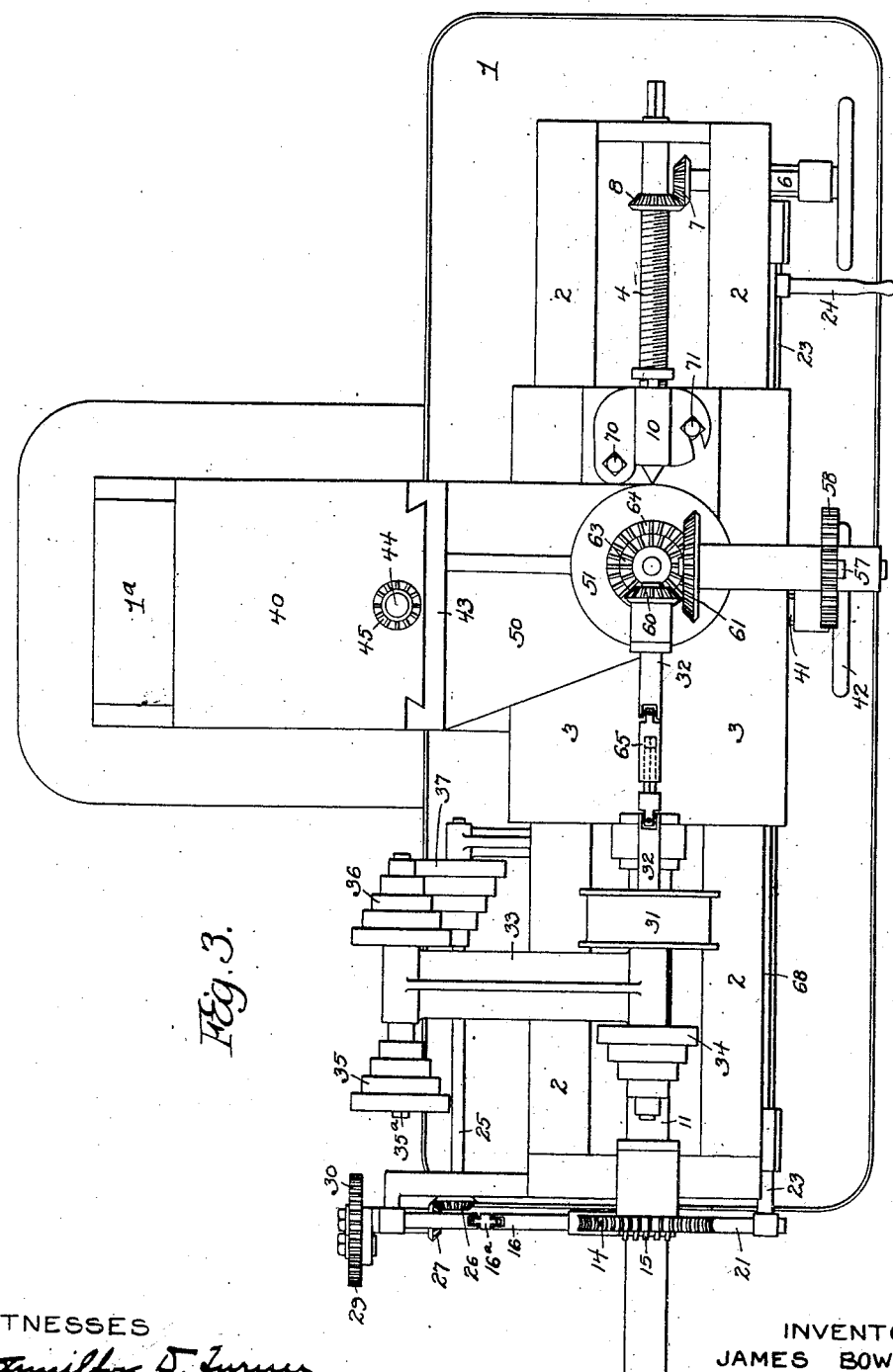

UNITED STATES PATENT OFFICE.

JAMES BOWEN, OF MANHEIM, PENNSYLVANIA.

MILLING-MACHINE.

1,177,376.  Specification of Letters Patent.  Patented Mar. 28, 1916.

Application filed December 27, 1912. Serial No. 738,882.

*To all whom it may concern:*

Be it known that I, JAMES BOWEN, a citizen of the United States, residing in Manheim, Lancaster county, Pennsylvania, have invented certain Improvements in Milling-Machines, of which the following is a specification.

The object of my invention is to provide a milling machine of relatively simple construction and capable of ready adaptation to the performance of different classes of work. This object I attain in the manner hereinafter set forth, reference being had to the accompanying drawings, in which—

Figure 1 is a front elevation of a milling machine constructed in accordance with my invention; Fig. 2 is an end view of the same looking in the direction of the arrow $x$, Fig. 1; Fig. 3 is a plan or top view of the machine with part of the mechanism removed therefrom; Fig. 4 is a transverse section of part of the tripping mechanism of the machine, and Fig. 5 is an enlarged section of an attachment permitting the use of a different form of milling tool from that shown in Fig. 2.

In the drawing, 1 represents the fixed base or bed of the machine having a superstructure 2 on which are formed guideways for a longitudinally traveling carriage or workholder 3, longitudinal movements being imparted to the latter by means of a longitudinally extending feed screw 4 mounted at each end in bearings on said superstructure 2 and engaging a nut on the carriage, as usual, rotative movement being imparted to this feed screw either by means of power applied to a worm wheel 5 at one end of the same, or by means of a hand wheel or crank applied directly thereto at the other end, or by means of a hand-operated shaft 6 and bevel wheels 7 and 8 at the latter end.

The work may be clamped directly to the carriage 3 when surface milling is to be performed or the work may be caused to rotate in respect to the milling tool if desired, the carriage 3 in the latter case being provided with a head stock 9, a tail stock 10, and a work-carrying shaft 11, the latter being free to rotate in the head stock 9 and to slide through a sleeve 72 which can rotate in a bearing 12 on the superstructure 2 as shown in Fig. 1, said shaft 11 being splined to the sleeve 72 so that it is compelled to rotate therewith. The shaft 11 is tubular so that, if desired, the work can be introduced or removed through the same.

Secured to the sleeve 72 is a worm wheel 14, driven by a worm 15 on a shaft 16 and the worm wheel 5 on the feed screw 4 is driven by a worm 17 on a shaft 18, said shafts 16 and 18 being adapted to fixed bearings at their rear ends but having forward bearings in a frame 19 which has a depending stem 20$^a$ guided vertically in a hollow stud 20 on the superstructure 2 and susceptible of being raised and lowered by reason of its engagement with a lever 21 pivoted to one end of the structure 2 and adapted to be engaged by a trigger 22 at one end of a shaft 23, the latter being free to turn in bearings on the front of the structure 2 and being provided with a handle 24, whereby it can be readily manipulated so as to cause the trigger to engage with the outer end of the lever 21 and thereby raise its inner end, and also the frame 19 with which it engages, to such position as to cause the worms 15 and 17 to mesh with the worm wheels 14 and 5, respectively, as shown in Fig. 2, movement of the shaft 23 so as to trip the trigger 22 permitting the frame 19 to fall so as to carry the worms 15 and 17 out of mesh with the worm wheels 14 and 5, respectively, and thereby stop the operation of the feed screw 4 and work-carrying shaft 11. In order to permit such rising and falling movement of the worms 15 and 17 the shafts 16 and 18 have universal joint sections 16$^a$ and 18$^a$, as shown in Fig. 2.

The shaft 18 is driven from a shaft 25 at the back of the machine through the medium of bevel gears 26 and 27 (Fig. 2) and the shaft 16 is driven from the shaft 18 through the medium of a train of spur gears 28, 29 and 30, so that by a suitable proportioning of these gears the speed of rotation of the shaft 16 and consequently of the work-carrying shaft 11 can be accurately regulated in respect to the speed of rotation of the shaft 18 and feed screw 4, or the rotation of the shaft 16 can be stopped without stopping the rotation of the shaft 18.

Power is applied to the machine in any desirable way, as for instance by means of a driving belt applied to a pulley 31 on a shaft 32 which is adapted to a bearing in the overhanging standard 33 mounted upon a bracket at the rear of the structure 2, this shaft also carrying a stepped pulley 34 in line with a reversely stepped pulley 35 carried by a shaft 35ᵃ adapted to bearings in the rear overhang of the standard 33, this shaft also having another stepped pulley 36 for driving a reversely stepped pulley 37 on the shaft 25, as shown in Figs. 2 and 3. The speed of rotation of the shaft 25 in respect to that of the shaft 32 can, therefore, be readily regulated by shifting the belt upon the stepped pulleys 34 and 35 or upon the stepped pulleys 36 and 37, or both.

At the rear of the machine is a vertically projecting post 40 which is free to slide back and forth upon guides at the top of a rearward extension 1ᵃ on the bed plate 1, such movement being imparted to the post by means of a feed screw 41 which can be operated by a hand wheel 42 at the front of the machine, and said post 40 has, on its forward face, guides for a vertically movable slide 43 which can be raised and lowered by means of a feed screw 44 driven by means of bevel gears 45 and 46 from a shaft 47 mounted in bearings on a plate 48 projecting forwardly from the upper end of the post 40, said shaft 47 having a hand wheel 49 whereby it can be readily manipulated.

The slide 43 has a forwardly projecting arm 50 terminating in a circular head 51 and from the latter is suspended, by a suitable axial pivot, a turntable 52 which carries depending bearings 53 for the shaft 54 of the milling tool 55 and also an upper bearing 56 for a shaft 57, the latter being in driving connection with the shaft 54 through the medium of a train of spur gears 58.

The shaft 57 is driven from the shaft 32 through the medium of a bevel wheel 60 on said shaft 32, a bevel wheel 61 on the shaft 57 and a duplex bevel pinion 63—64 mounted so as to turn loosely on the pivot shaft of the turntable 52, the bevel wheel 60 meshing with the member 63 of said duplex bevel pinion and the bevel wheel 61 meshing with the member 64 thereof, as shown in Fig. 3.

The turntable 52 carries a graduated scale so that the axis of the milling tool shaft 54 can be accurately adjusted to any desired degree in respect to the axis of the work-carrying shaft 11, or to the longitudinal line of movement of the carriage 3 in case said shaft is not employed, so that if, for instance, a spiral groove or slot is to be cut in the work carried between the head and tail stocks 9 and 10, the milling tool 55 can be adjusted to the angle corresponding to the pitch of said spiral slot or groove, the latter being determined by the relative speed of rotation of the feed screw 4 and work-carrying shaft 11. The rotary adjustment of the turntable 52 and of the shafts and gearing carried thereby can be effected without deranging any of said gearing, the bevel wheels 63 and 64 being concentric with the axis of rotation of the turntable.

In order to compensate for the rising and falling movement of the slide 43, the driving shaft 32 has a universally pivoted and telescopic section 65, as shown in Fig. 3, and in order to provide for the automatic tripping of the trigger 22 so as to automatically disconnect the driving worms 15 and 17 from the worm wheels 14 and 5, respectively, when the carriage 3 reaches either limit of its longitudinal movement, the trigger carrying shaft 23 is provided with a lug 66 (Fig. 4) normally in engagement with a pawl 67 on a slide rod 68 mounted in bearings at the front of the structure 2 and carrying longitudinally adjustable tappets 69 which may be struck by a suitable projection 69ᵃ on the carriage 3 when the latter reaches either termination of its longitudinal movement, thereby moving the pawl 67 out of engagement with the lug 66 and permitting the latter, under the stress of a suitable spring 80 to partially rotate the shaft 23 so as to withdraw the trigger 22 from engagement with the lever 21.

When it is not desired to rotate the work which is being acted upon by the milling tool the shaft 11 can be readily removed, the bearing 12 and head stock 9 being mounted so as to be quickly detachable from the structure 2 and carriage 3 and the tail stock 10 is pivoted by means of a bolt 70 and is held in place by means of a locking bolt 71 whereby, when the nut on the latter is slackened, the tail stock may be swung around on its pivot bolt 70 so as to be out of the way.

When it is desired to employ a milling tool having a vertical axis in place of one having a horizontal axis the tool-carrying member of the shaft 54 and the inner bearing 53 of the latter may be removed and a hanger 73, such as shown in Fig. 5, may be substituted for said bearing 53, this hanger having bearings for the vertical shaft 74 of the milling tool 75, which shaft has secured to it a bevel wheel 76 meshing with a bevel pinion 77 secured to a stud which is threaded, as shown at 78, for being screwed into the end of the driving section of the shaft 54.

The capacity of my improved machine for performing a wide range of work will be evident when it is borne in mind that the milling tool may be caused to rotate either about a horizontal or a vertical axis, said tool can be adjusted to any desired position in respect to the work; the latter may be either fixed or caused to rotate, and, in the latter case, the speed of its rotation in respect to the speed of the longitudinal movement can be varied to any extent desired.

I claim:

The combination, in a milling machine, of a fixed bed, a longitudinally movable carriage on said bed, a vertically projecting post laterally movable on said bed, a vertically movable slide on said post, said slide having an arm projecting over the longitudinally movable carriage on the bed, a turntable mounted so as to rotate about a vertical axis on said projecting arm, a tool carrying shaft mounted in bearings depending from said turntable, said shaft having a horizontal axis, a driving gear wheel rotating about a fixed axis coincident with the axis of the turntable, gearing carried by and movable with the turntable and serving to transmit the movement of said driving gear wheel to the tool carrying shaft on the turntable, a work holding shaft mounted to rotate in bearings on the longitudinally moving carriage, said shaft being longitudinally movable with said bearings, and a rotating device for said shaft mounted in bearings on the fixed bed and through which said work holding shaft can move longitudinally.

In testimony whereof, I have signed my name to this specification, in the presence of two subscribing witnesses.

JAMES BOWEN.

Witnesses:
M. T. WILLIAMS,
SUE M. STROH.